Feb. 23, 1926.
A. B. OVERHOLT
1,574,105
RIM CUT TIRE CLAMP
Filed Sept. 23, 1925
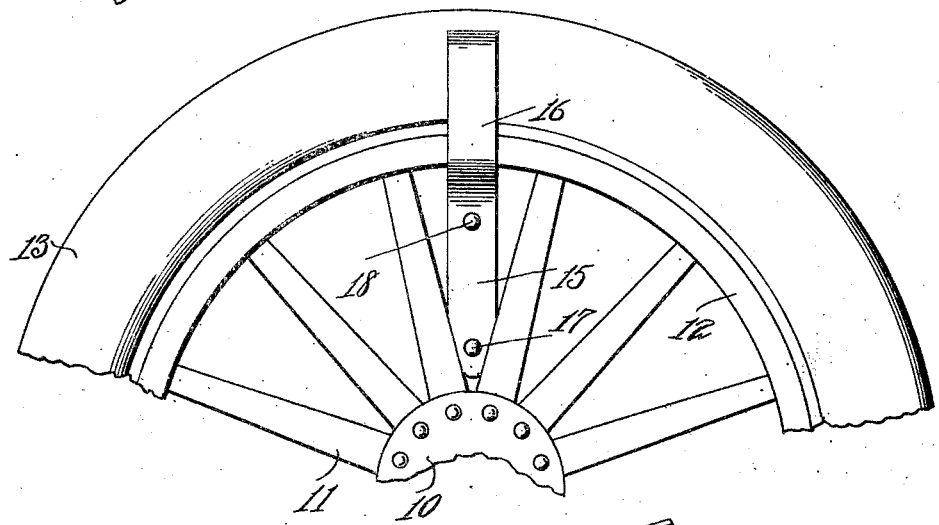
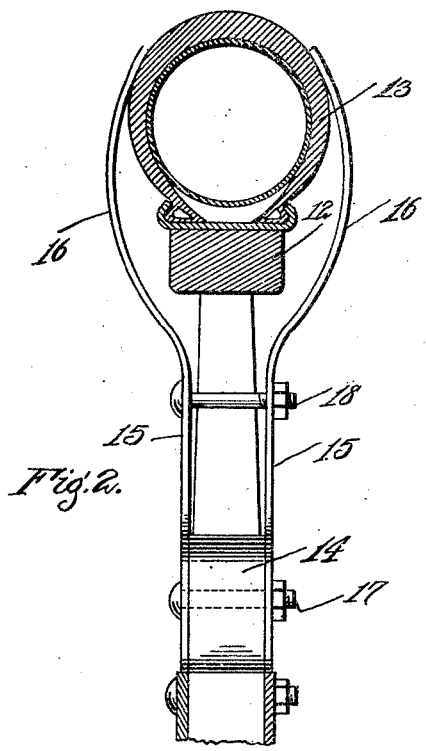
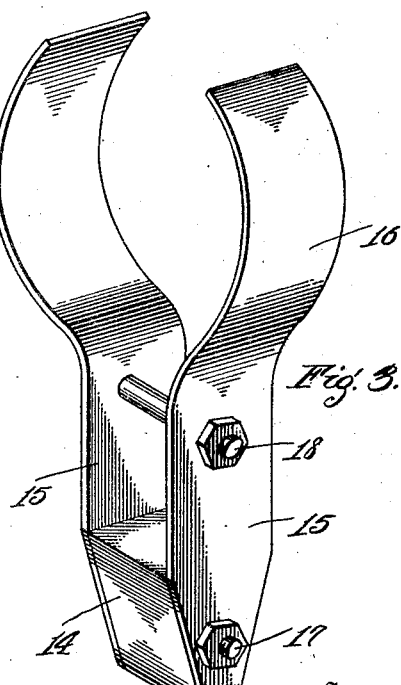
Inventor
Aaron B. Overholt.
By
Attorney Patented Feb. 23, 1926.

1,574,105

UNITED STATES PATENT OFFICE.

AARON B. OVERHOLT, OF THREE RIVERS, MICHIGAN.

RIM-CUT TIRE CLAMP.

Application filed September 23, 1925. Serial No. 58,143.

*To all whom it may concern:*

Be it known that I, AARON B. OVERHOLT, a citizen of the United States, residing at Three Rivers, in the county of St. Joseph, State of Michigan, have invented certain new and useful Improvements in Rim-Cut Tire Clamps; and I do hereby declare the following to be a full, clear, and exact description of the invention, such as will enable others skilled in the art to which it appertains to make and use the same.

This invention relates to new and useful improvements in automobile accessories, and particularly to devices for use in connection with tires which have become cut by the rim of the wheel.

When a deflated tire is run upon, the rim often cuts into the tire, with the result that such point in the tire is liable to breakage, and permit the inner tube to burst therethrough. Blow-out patches are ordinarily used inside of the tire casing to hold the tube against bursting, but this requires that the tire be removed from the wheel, and the tube taken out, to permit the insertion of the patch. The particular object of the present invention is to provide a device which may be easily and quickly applied to the wheel and tire, to hold the latter, at the point of wear by a rim, so that it will be unnecessary to remove the tire from the wheel.

Another object is to provide a device of this character which is simple in construction, easy to apply and remove, and which will not interfere with the contact of the tire with the road surface.

Other objects and advantages will be apparent from the following description when taken in connection with the accompanying drawing.

In the drawing:

Figure 1 is a side elevation of a portion of a rim and tire, showing the position of the device.

Figure 2 is a transverse sectional view through the tire and rim, showing the invention in elevation.

Figure 3 is a perspective view of the device removed from the tire and wheel.

Referring particularly to the accompanying drawing, 10 represents a portion of a hub, from which extend the spokes 11, and to the outer ends of the latter of which is secured the rim or felly 12. On the rim is properly seated the tire 13.

Disposed between the spokes 11, and fitted into the angle therebetween, adjacent the hub 10, is a wedge-shaped block of wood, or other suitable material 14. Disposed against each side of the block is the adjacent end of a metal strip 15, the other end of which is outwardly curved, or bowed, as at 16, and engages with the side of the tire. Disposed through the first-named ends of the strips 15, and through the block 14, is a clamping bolt 17, which properly holds the strips in position. Disposed through the strips 15, intermediate the rim and the block, is a clamping bolt 18, which serves to draw the strips together, and into firm engagement with the tire. The particular shape of the strips 15, and the manner in which the bowed ends thereof engage with the tire, cause said strips to press inwardly against the sides of the tire, and also exert an inward radial pressure on the tire, with the result that the tire is held firmly against any tendency to distend through the rim cut, and under the pressure of the inflated inner tube. The tightening of the bolt 18 exerts inward and downward pressure on the rim cut portion of the tire, so that the driver does not need to remove the tire from the rim, upon discovery of the rim cut, but simply applies the present device, and continues his trip. The invention is simple in construction, formed from few parts, and can be readily carried in the tool box of the automobile.

It will also be noted that the strips 15 are of such length that their outer ends do not contact with the road surface, thus eliminating any interference with the proper movement of the vehicle, and the flexing of the tire.

What is claimed is:

1. A device for preventing a blow-out in a pneumatic tire including clamping members engaged with the sides of a rim cut tire, and means for moving the members to exert pressure on the tire transversely and vertically.

2. A device for preventing a blow-out in a rim cut tire including a pair of clamping members engaged with the sides of the tire at the cut, and means carried by the clamping members for drawing the members together whereby to exert transverse and vertical pressure on the tire.

3. A device for preventing a blow-out in a rim cut tire including a pair of clamping members having tire engaging end portions, a retaining block for the other ends of the members seated between the hub attached ends of adjacent spokes of a wheel, and tension bolts disposed through the members whereby to exert transverse squeezing pressure at the sides of the tire and vertical pressure on the tire in the direction of the hub.

In testimony whereof, I affix my signature.

AARON B. OVERHOLT.